United States Patent
Mahbod et al.

(10) Patent No.: US 10,212,194 B2
(45) Date of Patent: Feb. 19, 2019

(54) SERVER CONTROLLED THROTTLING OF CLIENT TO SERVER REQUESTS

(71) Applicant: Google Inc., Mountain View, CA (US)

(72) Inventors: Aurash Mahbod, San Jose, CA (US); Ficus Kirkpatrick, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 952 days.

(21) Appl. No.: 14/261,047

(22) Filed: Apr. 24, 2014

(65) Prior Publication Data

US 2015/0207823 A1     Jul. 23, 2015

Related U.S. Application Data

(60) Provisional application No. 61/929,413, filed on Jan. 20, 2014.

(51) Int. Cl.
| | | |
|---|---|---|
| *H04L 29/06* | (2006.01) | |
| *H04L 12/801* | (2013.01) | |
| *H04L 29/08* | (2006.01) | |

(52) U.S. Cl.
CPC .......... *H04L 65/1069* (2013.01); *H04L 47/10* (2013.01); *H04L 67/32* (2013.01)

(58) Field of Classification Search
CPC .................................................. H04L 65/1069
USPC ......................................................... 709/228
See application file for complete search history.

(56) References Cited

U.S. PATENT DOCUMENTS

| | | | | |
|---|---|---|---|---|
| 6,526,433 B1 * | 2/2003 | Chang | ................. | G06F 11/0709 709/201 |
| 7,680,038 B1 * | 3/2010 | Gourlay | ............. | H04L 41/0896 370/230 |
| 7,937,470 B2 * | 5/2011 | Curley | .................... | H04L 41/12 370/241 |
| 7,953,870 B1 * | 5/2011 | Reeves | ............... | H04L 41/0816 709/223 |
| 8,200,812 B2 | 6/2012 | Anderson et al. | | |
| 8,218,543 B2 | 7/2012 | Batteram et al. | | |

(Continued)

OTHER PUBLICATIONS

European Patent Office, International Search Report and the Written Opinion in International Patent Application PCT/US2015/012058 (dated Apr. 23, 2015).

*Primary Examiner* — Kevin T Bates
*Assistant Examiner* — Ronak Patel
(74) *Attorney, Agent, or Firm* — Shumaker & Sieffert, P.A.

(57) ABSTRACT

Embodiments of the invention provide methodologies for server-controlled throttling of client to server requests in order to improve client-server communication performance. Embodiments of the invention relate to systems and methods that provide routines for real-time monitoring of requests originating from client devices, for analyzing the characteristics of the requests, for developing protocols for managing requests within a client-server infrastructure, and for facilitating client adherence to the developed protocols. The systems and methods contemplated by the present invention involve means for monitoring the requests received by servers from client devices, means for analyzing the characteristics of the requests, means for developing client-server communication protocols intended to improve client-server communication performance, and means for delivering the protocols to a plurality of client devices.

20 Claims, 5 Drawing Sheets

(56) References Cited

U.S. PATENT DOCUMENTS

| | | | |
|---|---|---|---|
| 8,260,940 B1* | 9/2012 | Vosshall | H04L 67/16 709/228 |
| 8,452,866 B2* | 5/2013 | De Boer | 709/224 |
| 2003/0061367 A1* | 3/2003 | Shah | H04L 47/10 709/230 |
| 2006/0031553 A1* | 2/2006 | Kim | H04L 29/06027 709/231 |
| 2006/0233108 A1* | 10/2006 | Krishnan | H04J 3/1682 370/235 |
| 2010/0030914 A1 | 2/2010 | Sparks et al. | |
| 2010/0257525 A1* | 10/2010 | Yin | G06F 8/60 718/100 |
| 2011/0161488 A1 | 6/2011 | Anderson et al. | |
| 2011/0258049 A1* | 10/2011 | Ramer | G06F 17/30867 705/14.66 |
| 2011/0264778 A1 | 10/2011 | McGregor et al. | |
| 2011/0277027 A1* | 11/2011 | Hayton | H04L 63/0884 726/8 |
| 2012/0076016 A1* | 3/2012 | Robbins | H04L 12/2697 370/252 |
| 2012/0101952 A1* | 4/2012 | Raleigh | G06Q 30/016 705/304 |
| 2012/0224522 A1* | 9/2012 | Kim | H04W 4/06 370/312 |
| 2012/0236717 A1* | 9/2012 | Saska | H04W 48/02 370/235 |
| 2013/0046879 A1 | 2/2013 | Garcia et al. | |
| 2013/0097309 A1* | 4/2013 | Ma | H04L 29/08099 709/224 |
| 2013/0122910 A1* | 5/2013 | Singh | H04W 36/18 455/437 |
| 2013/0191525 A1* | 7/2013 | Kang | H04L 69/162 709/223 |
| 2013/0267253 A1* | 10/2013 | Case | H04W 4/021 455/456.3 |
| 2013/0283374 A1* | 10/2013 | Zisapel | H04L 63/1408 726/22 |
| 2013/0315389 A1* | 11/2013 | Jung | H04L 63/065 380/31 |
| 2014/0093065 A1* | 4/2014 | Hartman | H04M 3/465 379/265.14 |
| 2014/0094159 A1* | 4/2014 | Raleigh | H04W 24/02 455/418 |
| 2014/0303934 A1* | 10/2014 | Mylarappa | G06F 11/3006 702/186 |
| 2014/0379872 A1* | 12/2014 | Eisl | H04L 67/06 709/219 |
| 2015/0023161 A1* | 1/2015 | Alisawi | H04W 76/10 370/230 |
| 2015/0098393 A1* | 4/2015 | Tofighbakhsh | H04W 24/02 370/329 |
| 2016/0080502 A1* | 3/2016 | Yadav | H04L 41/12 709/227 |
| 2016/0086222 A1* | 3/2016 | Kurapati | G06Q 30/0204 705/14.53 |

* cited by examiner

SERVER CONTROLLED THROTTLING OF CLIENT TO SERVER REQUESTS

BACKGROUND

In recent years, advances in computer processors and wireless networks have engendered a proliferation of mobile computing devices. The popularity of smart phones, tablet computers, wearable computerized devices, and a variety of other devices has increased dramatically in recent years. Advances at the hardware level have enabled such devices to be made increasingly smaller and more portable and thereby increased consumer demand for such devices. Simultaneously, software advances have dramatically increased the array of features such computerized devices provide. Many software services rely on resources provided by remotely located servers. In order to access and utilize such resources, mobile devices communicate with the remotely located servers through a variety of both wireless and wired networks. However, the capacity of such servers to connect and share resources with clients is inherently limited. As the number of mobile devices has increased, the burden on server networks has also increased, and the risk that a server may become overwhelmed with requests from client devices has increased as well. Heavy traffic client request can result in considerable degradation of server performance by consuming server resources. In extreme cases, heavy client traffic can render the server entirely unable to provide requested resources to clients.

SUMMARY

Embodiments of the invention provide methodologies for server-controlled throttling of client to server requests in order to improve client-server communication performance. Embodiments of the invention relate to systems and methods that provide routines for real-time monitoring of requests originating from client devices, for analyzing the characteristics of the requests, for developing protocols for managing requests within a client-server infrastructure, and for facilitating client adherence to the developed protocols. The systems and methods contemplated by the present invention involve means for monitoring the requests received by servers from client devices, means for analyzing the characteristics of the requests, means for developing client-server communication protocols intended to improve client-server communication performance, and means for delivering the protocols to a plurality of client devices. The network traffic management functionality may by implemented by a computer system that comprises instructions stored in a non-transitory computer-readable medium and one or more processors that execute the instructions.

Client devices often adhere to particular procedures in attempting to acquire resources from a server. A client transmits a request for resources to a server and then waits for a response from the server. Client software often specifies a maximum time for which the client will wait for a response from a server. If the maximum wait time is reached, the client will deem the request as failed and retransmit the request. Typically, client software also specifies a maximum number of request retries, and if the maximum number of retries is reached without the client receiving the requested resource from the server, the client may deem the resource to be unavailable or take other remedial action. The maximum wait time, or socket timeout, and the request retry limit may be specified by the client operating system, by client network interface software, or by the network carrier that the client utilizes for transmission of requests to the server. These client-server communication parameters, i.e. the socket timeout and request retry limit, may vary based on the type of request or based on a classification of the type of resource being requested. However, the values of these communication parameters are typically static, i.e. they do not change in response to behavior of the server, to behavior of other client devices, or to external conditions that impact communications between the client and the server. Clients are generally unable to account for external factors in setting the values of the client server communication parameters. The inability of clients to response to dynamic external factors can result in clients sending an excessive number of resource requests and thereby causing a degradation in client-server communication performance through wasteful consumption of server resources.

Embodiments of the present invention utilize the capabilities of a server to aggregate data corresponding to requests issued to the server by vast numbers of remotely located clients. Embodiments of the present invention further utilize the capabilities of computer processors to analyze the aggregated data in real time and to determine whether or not communication between the clients and the server could be improved through a modification of client-server communication parameters utilized by clients in requesting resources from the server. In the event that the processing routines encompassed by the present invention determine that a modification of the client-server communication parameters could improve client-server communication performance, the processing routines may further calculate updated client server communication parameters and transmit the updated parameters to the client devices. In this manner, the present invention enables a server to throttle client requests based on information aggregated from the various client devices. The server therefore functions as a centralized request management authority that accounts for the totality of client activity in prescribing procedures for client server communications.

One implementation contemplates a method, implemented by one or more processors executing instructions stored at computer-readable storage media, for throttling client-to-server resource requests, the method comprising producing one or more data sets, wherein each data set comprises a plurality of data points representing a characteristic of an instance of client-server communication, determining whether a condition for triggering a client-server communication parameter update has been met, and when a condition for triggering a client-server communication parameter update has been met, calculating updated client-server communication parameters, and transmitting the updated client-server communication parameters to one or more clients.

Another implementation contemplates a server comprising a processor and a computer readable storage medium having stored thereon processor executable instructions, the server further comprising a client-server communication monitoring module configured to produce one or more data sets and to determine whether a condition for triggering a client-server communication parameter update has been met, a client-server communication analysis module configured to calculate updated client-server communication parameters, and a client command transmission module configured to transmit the updated client-server communication parameters to one or more clients, wherein each data set comprises a plurality of data points representing a characteristic of an instance of client-server communication.

An additional implementation contemplates a system for server-controlled throttling of client-to-server requests, the system comprising a server comprising a processor and a computer readable storage medium, the server configured to, produce one or more data sets, wherein each data set comprises a plurality of data points representing a characteristic of an instance of client-server communication, determine whether a condition for triggering a client-server communication parameter update has been met, calculate updated client-server communication parameters, and transmit the updated client-server communication parameters to a client, and a client comprising a processor and a computer readable storage medium, the client configured to transmit a request to the server, receive the updated client-server communication parameters from the server, and implement procedures for transmitting requests to the server that utilize the updated client-server communication parameters.

DETAILED DESCRIPTION

Figure 1:
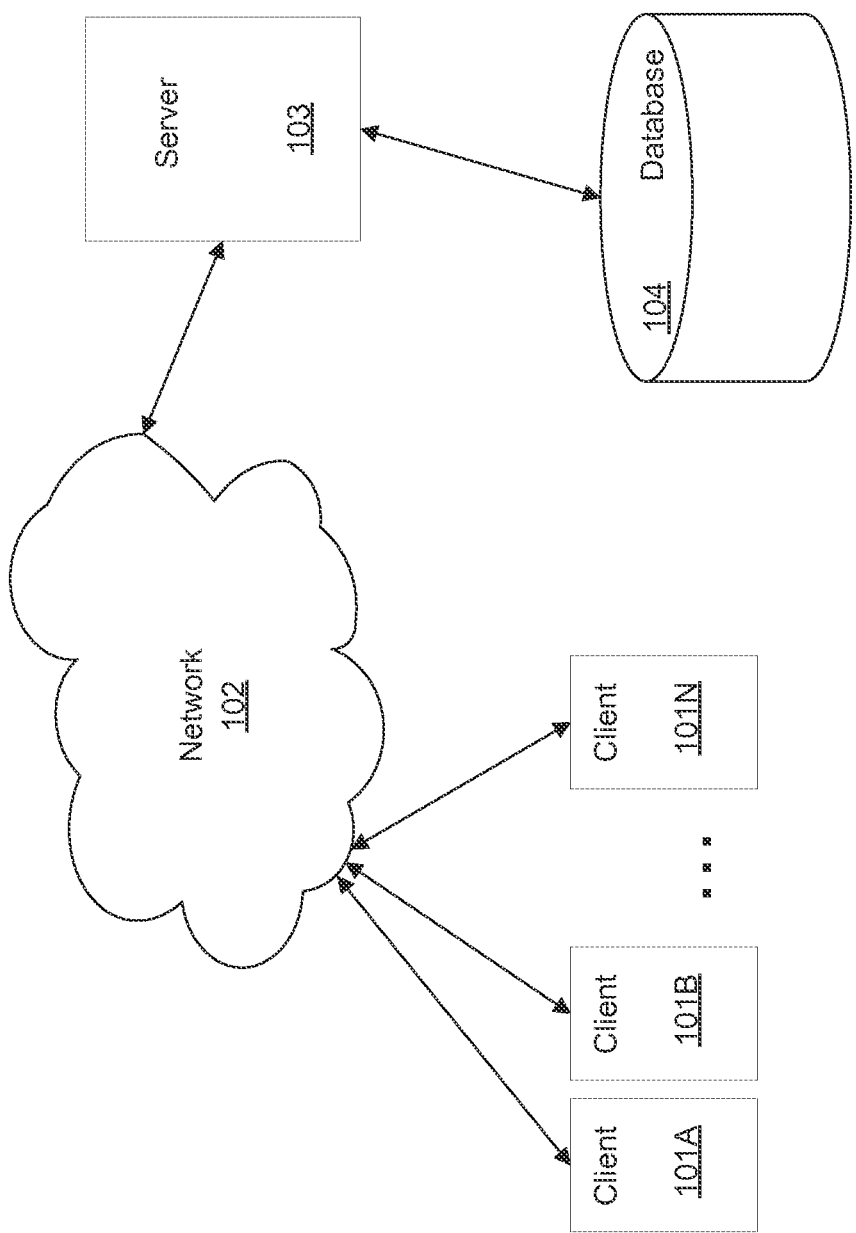
FIG. 1 is a block diagram of an example environment in which the methodologies for server-controlled throttling of client-to-server requests may be implemented.

FIG. 1 is a block diagram of an example environment in which methodologies for facilitating user interaction with the user's present environment may be implemented. In the example environment depicted in FIG. 1, clients 101A and 101B through 101N are connected to a network 102. The network 102 enables the clients 101 to communicate with a server 103. The server 103 is further connected to a database 104. Database 104 stores a variety of information pertaining to user accounts managed by the server 103.

Clients 101 may be any of a smart phone, a personal digital assistant (PDA), a tablet computer, a wearable computer, a laptop computer, a video-game console, or any one of a number of additional devices that may establish communicative connections with a server over a network. Clients 101 are capable of sending information to and receiving information from the server 103. The clients 101 may receive data and information that is pushed from the server 103 and may also receive transmissions of data and information that are responsive to requests previously sent by the clients 101 to the server 103. For example, clients 101 may request a web page or a file from the server 103 and may receive the requested web page or file from the server 103. The clients 101 may also receive push notifications from the server 103.

The network 102 connects the clients 101 to the server 103. The network 102 may be either a wired or a wireless network, and may include elements of a cellular network, a voice over internet protocol (VoIP) network, a public switched telephone network (PSTN), or a combination thereof. Example networks include but are not limited to an LTE network, a GSM network, a CDMA network, a fiber optic network, and other voice or data networks. The network 102 may also include elements of WLAN or WPAN networks that enable the clients 101 to connect to other components of the network, for example an LTE network. The network 102 may include a set of cell towers, as well as a set of base stations and/or mobile switching centers (MSCs). As appreciated by those skilled in the art, the network 102 may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of the network 102, the network 102 may include one or more IP multimedia subsystems (IMS), serving gateways (SGW), and evolved node Bs (eNB). One of ordinary skill in the art will recognize that additional components not mentioned herein may be used by the network 102.

The server 103 comprises processors and memory configured to receive requests for information from the clients 101 and to provide data and information to the clients 101. The server 103 is further configured to aggregate data pertaining to the requests transmitted by the clients 101 and to analyze the aggregated data. The data aggregated by the server may include a variety of information pertaining to the clients 101 that is not limited to data pertaining to a user account affiliated with a client, data pertaining to the user-facing latency encountered by a client in transmitting a request to a server, data pertaining to backend latency and on the wire latency associated with requests transmitted from the client to the server, data pertaining to client-to-server communication procedures practiced by a client, data pertaining to the geographic location of a client, data pertaining to a wireless carrier utilized by a client for communication with the server 103, contextual data pertaining to a client, and a variety of additional information. The server 103 may further include processors and memory configured to calculate updated client server communication procedures intended to improve the communication between the server and the multitude of clients 101.

Processors and memory located at the user-environment interaction server 103 may also be configured to both access information stored at a database and to store information at a database, such as database 104. For example, the server 103 may be configured to store information pertaining to data and statistics that are representative of the requests transmitted by the clients 101 to the server 103. Furthermore, the server 103 may be configured to request data representative of previous data and statistics corresponding to requests transmitted by clients to the server 103.

The server 103 is also connected to the database 104. The database 104 may store a variety of information, including, e.g., information pertaining to one or more user accounts. Information pertaining to the one or more user accounts may include but is not limited to a user account name, the name of a user to whom the user account belongs, an alias for the user account, verification information for the user account, a social network profile associated with the user account, images associated with the user account, documents and media content associated with the user account, and various user account settings. Furthermore, database 104 may also store a variety of data pertaining to client-server communication performance and client request statistics.

Embodiments of the invention that may be practiced in the example environment represented by FIG. 1 are generally drawn towards managing requests that are issued by clients and directed to one or more servers. Embodiments of the invention contemplate monitoring, in real-time, data pertaining to requests issued to a particular server (or to a particular group of servers) by clients that are members of a particular class. Data points can be obtained for each request issued by a particular client and the data points corresponding to clients that are members of a particular class can be aggregated to form a data set representative of the class. For example, data points for each request sent by a client that utilizes a particular wireless carrier may be aggregated in real-time in order to produce a data set representative of the class of clients that subscribe to the particular wireless carrier. Similarly, the data points might be selected from requests transmitted by clients that are members of a class defined by a particular geographic area. Class of clients may also be defined by multiple conditions, e.g. clients that subscribe to a particular wireless carrier that are also located in a particular geographic location. Furthermore, data originating from a single client may be included in multiple data sets if that single client is a member of multiple classes.

Embodiments of the invention further contemplate detecting a client request throttling trigger during monitoring of the request data representative of a particular class. A variety of client request throttling triggers may be specified for a variety of different classes of clients. In general, client request throttling triggers correspond to situations where an adjustment in the client request parameters for a class of clients is likely to result in a reduction in the mean or median latency experienced by the clients in the class or to result in otherwise improved client-server communication. In some implementations, the client request throttling triggers may correspond to predetermined statistical thresholds. For example, if the median latency experienced by members of a class of clients exceeds a threshold, a client request throttling process is triggered. Alternatively, events may trigger the throttling of client requests. For example, the release of new content on a server that is expected to draw a large number of requests from clients may trigger the throttling of client requests by the server. Similarly, changes to a wireless network or to another network utilized by clients to transmit requests to a server may trigger the throttling of client requests by the server.

Embodiments of the invention also contemplate the calculation, by the server, of updated client server communication parameters. The updated parameters can be transmitted to the clients in order to throttle the requests transmitted by the clients and thereby improve client server communications. In order to calculate updated client-server communication parameters, the systems and methods of the present invention may consult a variety of contextual and historical data that is relevant to the particular class of clients for which the client request throttling trigger is detected. For example, in calculating client server communication parameters, the systems and methods of the present invention may utilize characteristics of distributions of client request data points, historical client server communication performance under similar circumstances corresponding to analogous events, historical client-server communication performance at the same time of day, month, or year, specific characteristics of each client device and user account associated with each client device, and a variety of additional information.

Furthermore, certain embodiments of the present invention contemplate the distribution of the calculated client-server communication parameters from the server to the clients that are members of the class for which the parameters have been calculated. In various implementations, the transmission of the client-server parameters to the clients may be executed in various manners. In some implementations, the server may transmit the updated parameters in response to further requests issued by the clients. For example, the server may affix a header to responses to client requests where the header specifies the updated client-server parameters. Alternatively, the server may transmit the updated client-server parameters to the clients that are members of the class for which the parameters have been calculated in a broadcast or multicast.

Through the monitoring of client-server requests and other client-server network traffic attributable to particular classes of clients, the present invention enables a server to detect network issues that are confined to particular classes of clients. The server is thereby able to calculate client-server communication parameters that are uniquely tailored to a particular class of clients. The present invention thus enables a server to independently manage client-server communication parameters for multiple classes of clients and thereby improve the median latency experienced by all clients in the aggregate. Furthermore, by detecting issues that are specific to a particular class of clients, the present invention can prevent a network issue that is confined to a particular class of clients from resulting in a distributed denial of service (DDOS) attack that renders the server inaccessible to all clients.

Figure 2:
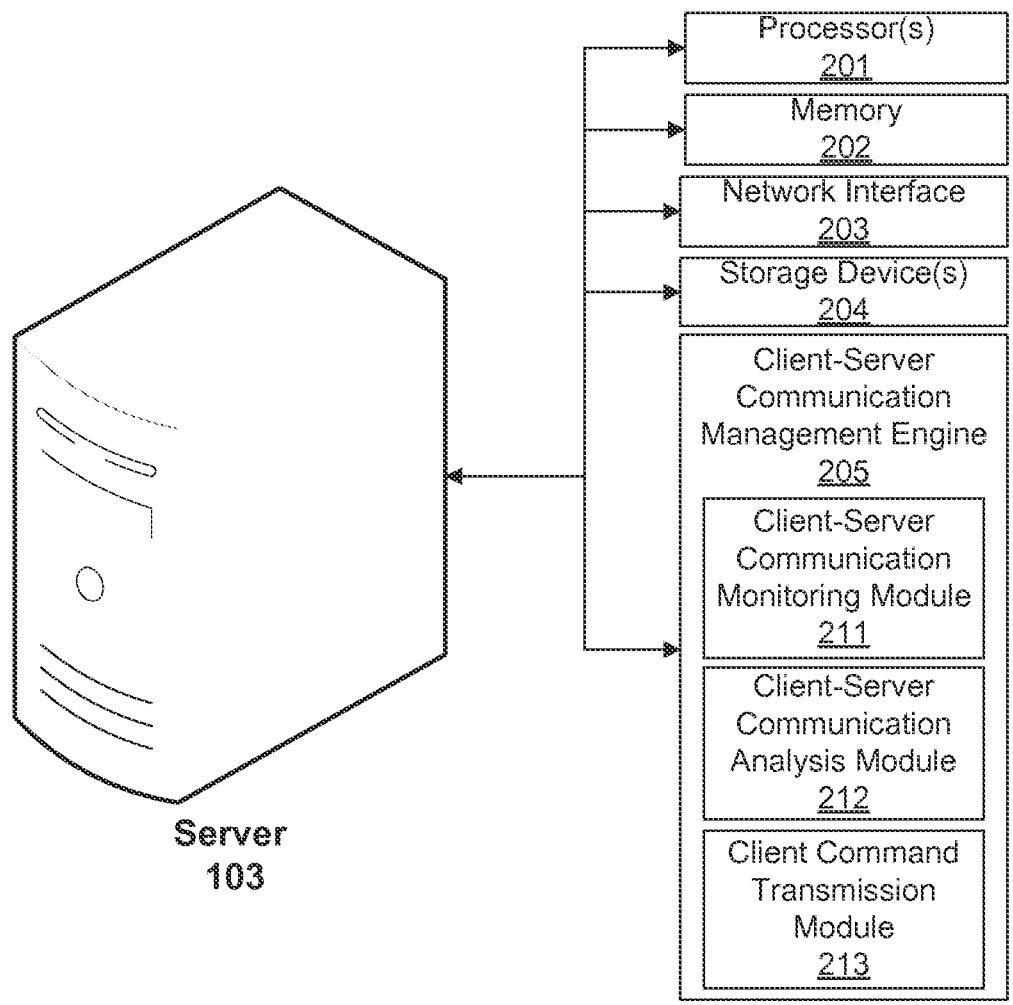
FIG. 2 is a block diagram of the basic functional components for an example server depicted in FIG. 1, according to one aspect of the disclosure.

FIG. 2 is a block diagram of the basic functional components for the server 103 depicted in FIG. 1, according to one aspect of the disclosure. The server 103 includes one or more processors 201, memory 202, a network interface 203, one or more storage devices 204, and a client-server request management engine 305. In a conventional fashion, each of components 201, 202, 203, 204, and 205 are interconnected physically, communicatively, and/or operatively for inter-component communications. The server 103 may be a web server, a file server, may function as both a web server and a file server under different circumstances, or may be any other type of server.

As illustrated, processors 201 are configured to implement functionality and/or process instructions for execution within user-environment interaction server 200. For example, processors 201 execute instructions stored in memory 202 or instructions stored on storage devices 204. Memory 202, which may be a non-transient, computer-readable storage medium, is configured to store information within server 103 during operation. In some embodiments, memory 202 includes a temporary memory, i.e. an area for information to be maintained when the server 103 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The user-environment interaction server 200 uses network interface 203 to communicate with external devices via one or more networks, such as the network 102 of FIG. 1. Such networks may include one or more wireless networks, wired networks, fiber optics networks, and other types of networks through which communication between the server 103 and an external device may be established. Network interface 203 may be a network interface card, such as an Ethernet card, an optical transceiver, a radio frequency transceiver, or any other type of device that can send and receive information.

Client-server communication management engine 205 is configured to receive information pertaining to requests made to the server 103 from one of the clients 101 and to aggregate data pertaining to the requests received by the server from a multitude of clients. Specifically, client-server communication management engine is configured to . Client-server communication management engine 205 includes client-server communication monitoring module 211, client-server communication analysis module 212, and client command transmission module 213.

Client-server communication monitoring module 211 is configured to monitor requests received from clients 101 and develop data pertaining to the requests received from the clients. The client-server communication monitoring module 211 may further establish side channels with one or more of the multiple clients that transmit requests to the server 103. Alternatively, the client-server communication monitoring module 211 may receive data or information from a distinct entity that is utilized to establish side-channel communication with clients 101. The client-server communication monitoring module 211 is configured to classify clients into one or more classes based on a variety of characteristics of the client being classified. The client may be classified based on the wireless carrier to which the client subscribes, based on a particular segment of a wireless network that the client utilizes, based on geographic location, based on type of device, based on the user account with which the client is affiliated, and based on a variety of additional characteristics of the client. The client-server communication monitoring module 211 is further configured to develop data sets that include data points that are representative of the communications between the server 103 and the individual clients 101. Data sets may be established for each of the classes into which the client-server communication monitoring module categorizes the individual client devices.

Client-server communication analysis module is configured to analyze the characteristics of data aggregated by the client-server communication monitoring module and to determine whether or not the performance of the communication between the server 103 and classes of clients can be improved through modification of current client-server communication parameters or otherwise. Furthermore, client-server communication analysis module is configured to calculate updated client-server communication parameters to improve the communication flow between the server 103 and the multitude of client devices 101.

Client command transmission module 213 is configured to transmit updated client-server communication parameters to the clients 101. In various implementations, the client command transmission module 213 may facilitate a broadcast of updated communication parameters, a multicast of updated communication parameters, or may facilitate the addition of a header including updated communication parameters to data packets responsive to client requests.

While FIG. 2 depicts a single server entity that both receives resource requests from clients, provides resources to clients, and monitors and analyzes traffic flow from various classes of clients to the server, alternative configurations are possible. For example, the traffic flow analysis and monitoring may be performed by a processor executing instructions stored at a machine-readable medium located remotely from the other elements of the server. In various implementations of the present invention, the hardware utilized to implement the functionality of the server 103 may be distributed across multiple ostensibly distinct devices or may be located at a single device.

Figure 3:
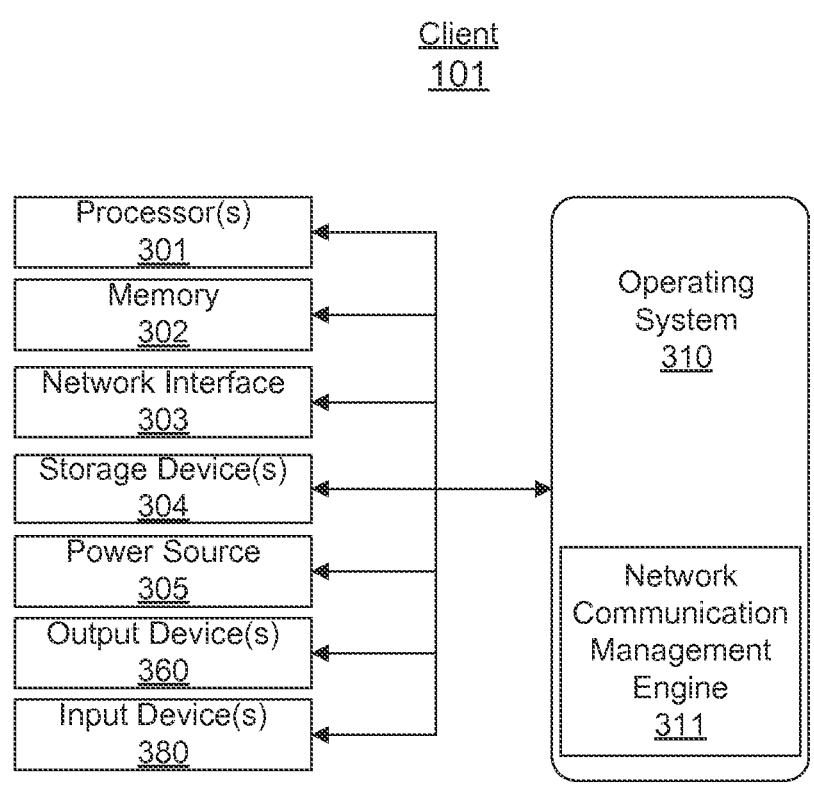
FIG. 3 is a block diagram of the basic functional components for an example client depicted in FIG. 1, according to one aspect of the disclosure.

Turning now to FIG. 3, a block diagram of the basic functional components for an example client of FIG. 1 is depicted. In general, many other embodiments of the client 101 may be used as long as the embodiment is capable of transmitting data to a server and receiving data from a server over one or more network interfaces. In the embodiment illustrated by FIG. 3, the client 101 includes one or more processors 301, memory 302, a network interface 303, one or more storage devices 304, a power source 305, one or more output devices 360, and one or more input devices 380. The client 101 also includes an operating system 310 that is executable by the client 101, and further includes a network communication management engine 311. In some implementations, the network communication management engine 211 may be a component of the operating system 310 (as is depicted by FIG. 3). In alternative implementations, the network communication management engine may be separate and distinct from the operating system 310 or may comprise elements of the operating system 310 as well as elements that are external to the operating system 310. In a conventional fashion, each of components 301, 302, 303, 304, 305, 310, 311, 360, and 380 are interconnected physically, communicatively, and/or operatively for inter-component communications.

As illustrated, processors 301 are configured to implement functionality and/or process instructions for execution within the client 101. For example, processors 301 execute instructions stored in memory 302 or instructions stored on storage devices 304. Memory 302, which may be a non-transient, computer-readable storage medium, is configured to store information within the client 101 during operation. In some embodiments, memory 302 includes a temporary memory, i.e. an area for information to be maintained when the client 101 is turned off. Examples of such temporary memory include volatile memories such as random access memories (RAM), dynamic random access memories (DRAM), and static random access memories (SRAM). Memory 302 also maintains program instructions for execution by the processors 301.

The client 101 uses network interface 303 to communicate with external devices via one or more networks, such as the network 104 of FIG. 1. The network interface 303 may include multiple interfaces for connecting with various types of networks. Such networks may include one or more wireless networks, wired networks, fiber optics networks, and other types of networks through which communication between the client 101 and an external device may be established. Network interface 303 may include a network interface card, such as an Ethernet card, an optical transceiver, a radio frequency transceiver, or any other type of device that can send and receive information. Other non-limiting examples of interfaces that may be included in the network interface 303 include Bluetooth, 3G and WiFi radios as well as USB interfaces.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client 101 includes one or more power sources 305 to provide power to the client. Non-limiting examples of power source 305 include single-use power sources, rechargeable power sources, and/or power sources developed from nickel-cadmium, lithium-ion, or other suitable material.

The client 101 includes one or more input devices 380. Input devices 380 are configured to receive input from a user through tactile, audio, and/or video feedback. Non-limiting examples of input device 380 include a presence-sensitive screen, a keyboard, a voice responsive system, a video camera, a microphone, and any other type of device for detecting a command from a user. In some examples, a presence-sensitive screen includes a touch-sensitive screen.

One or more output devices 360 are also included in client 101. Output devices 360 are configured to provide output to a user using tactile, audio, and/or video stimuli. Output device 360 may include a display screen (which may be part of a presence-sensitive screen), a sound card, a video graphics adapter card, or any other type of device for converting a signal into an appropriate form understandable to humans or machines. Additional examples of output device 360 include a speaker, a liquid crystal display (LCD), or any other type of device that can generate intelligible output to a user.

The client 101 includes an operating system 310, such as the Android® operating system. The operating system 310 controls operations of the components of the client 101. For example, the operating system 310 facilitates the interaction of the processors 301, memory 302, network interface 303, storage device(s) 304, input device 380, output device 360, and power source 305.

The client 101 further includes a network communication management engine 311. In various implementations the network communication management engine 211 may be a component of the operating system 310, may comprise components of the operating system 310, or may be distinct from the operating system 310. The environment analysis engine 311 is configured with processor executable instructions. Such processor executable instructions may facilitate the interaction of the processors 301, memory 302, network interface 303, storage device(s) 304, output device 360, input device 380, and motion sensors 390. The network communication management engine 311 is configured to control and manage the connections initiated by the client 101 through the network interface 303. The network communication management engine 311 may determine the protocols by which various connections are established and may specify process steps by which the connections are initiated and terminated. In particular, the network communication management engine 311 may determine procedures and rules by which requests are transmitted to web servers and file servers. Specifically, the communication management engine may specify communication parameters for connections with a server. Such communication parameters may include but are not limited to a socket timeout (the amount of time the client will wait for a response from a server after sending a request to the server before retransmitting the request) and a retry limit (the maximum number of times a request may be transmitted by the client before the client executes an alternative action). The network communication management engine 311 may maintain a variety of different communication parameters that correspond to a variety of different server. For example, if applications are installed on the client that utilize a particular server, the network communication management engine 311 may maintain unique communication parameters for each unique server that utilized by each of the applications.

Figure 4:
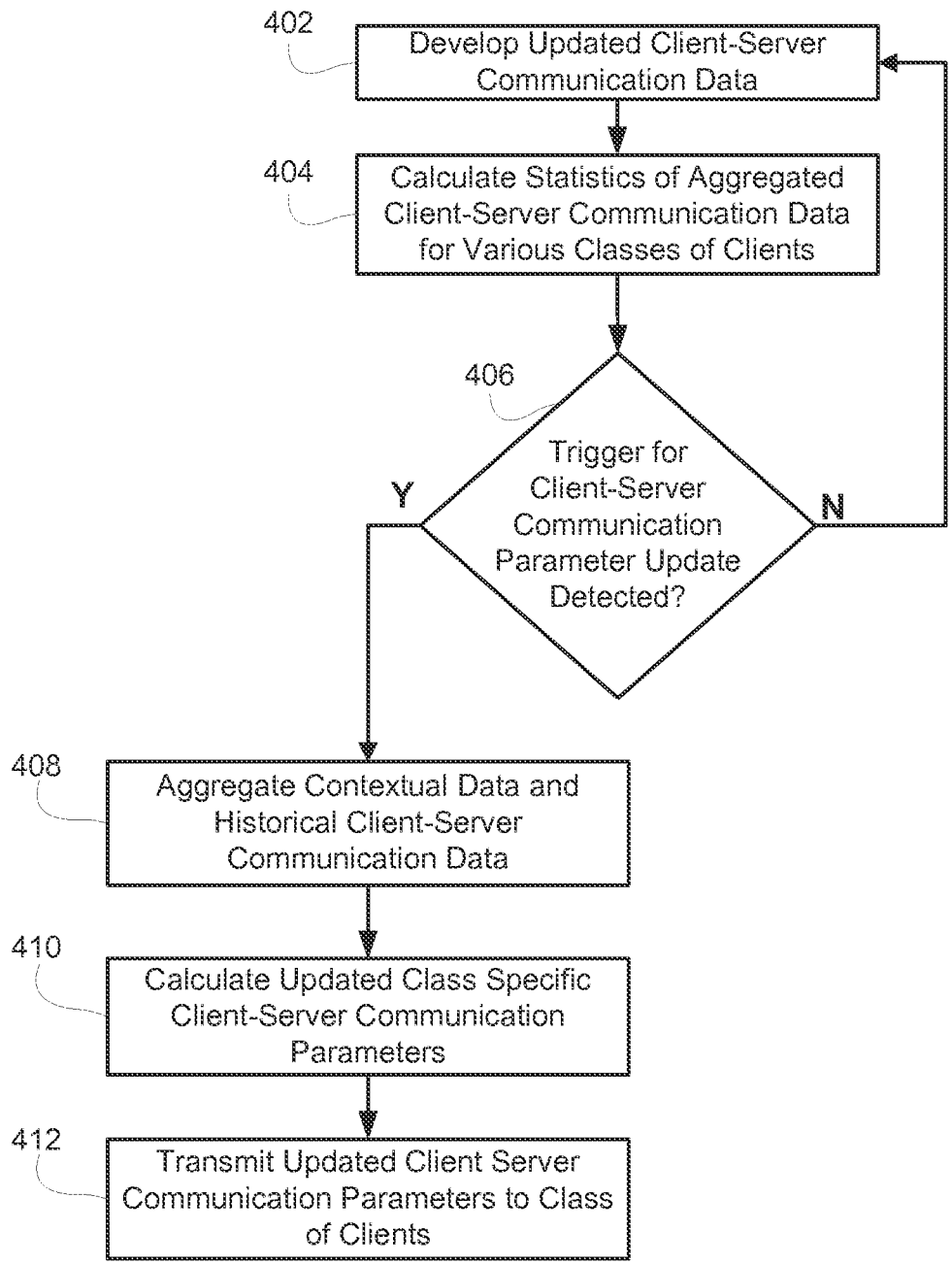
FIG. 4 is a flow diagram illustrating an example method, implemented at a server, for server controlled throttling of client server requests.

FIG. 4 is a flow diagram illustrating an example method, implemented at a server, for server controlled throttling of client server requests. At 402, the server 103 develops updated client-server communication data. The updated client-server communication data developed at 103 is developed via real time analysis of requests received by the server 103. In some implementations, the analysis of incoming requests may be performed by a specific processing module within the server 103, e.g. the client-server communication module 211 of the client-server request management engine 205. For example, data packets received by the network interface 203 of the server 103 may be analyzed by the client-server request management engine 205 in order to identify characteristics of the client from which the data packet originated. The analysis of the received requests may also identify of characteristics of the network through which the data packets were transmitted. The server 103 may also develop client-server communication data through information or data provided to the server 103 by a client. For example, the client may transmit a message that indicates the current user-facing latency experienced by the client.

The development of updated client-server communication data further involves segmenting the data according to various classes of clients. Clients may be classified according to their mobile network carrier, their geographic location, their device type, the characteristics of a corresponding user account, IP address, and a variety of other characteristics. Clients may be classified first according to a primary characteristic, and thereafter, the class defined by the primary characteristic may be further classified according to secondary characteristics. Additional classifications of subclasses may also be utilized in various implementations. For example, a particular class of clients may be defined according to the mobile network carrier, and all clients that utilize a particular mobile network carrier may be further classified based upon the geographic location of the device. The classifications may be determined according to a variety of algorithms and processing routines stored at computer readable storage media within the server, e.g. the storage devices 204, and executed by processors 201.

Development of client-server communication data at 402 involves aggregating data points representative of the requests received from various clients into data sets that correspond to the classes of clients. For example, data points representative of each request received from clients that utilize a particular wireless network carrier may be aggregated into a data set that is representative of the class of clients that utilize the particular wireless carrier. In various implementations, the data points utilized to produce a data set may include various types of information. For example, the data points may include information corresponding to user-facing latency, current socket timeout utilized by the client, the current number of retries allowed by the client, the current backend latency associated with the processing of a request, the current on-the-wire latency associated with a client-to-server request, and a variety of other types of data.

The process may also develop a variety of different data sets for each class of clients where the different data sets accumulate data over various time windows. Multiple data sets for user-facing latency (or any other client-server communication characteristic) experienced by a particular class of clients may be produced in which each data set consists of data points obtained during time windows of various duration. A first data set may consist only of data points that were received within the previous thirty seconds, a second data set might consist of data points that were received within the previous five minutes, and a third data set may include all data points that were received within the previous hour.

At 404, statistics of the aggregated client-server communication data are calculated for each of the various classes of clients. In particular, for each data set developed at 402, statistics of the data set are calculated at 404. Various types of regressions may be used to best approximate the data corresponding to each of the data sets developed at 402. For example, a distribution of user-facing latency for clients that utilize a particular wireless carrier network may be modeled with a Gaussian regression. Modeling the distribution of data points in a data set corresponding to a particular characteristic of client-to-server requests for a particular class of clients allows the mean, median, and variance of the data set to be determined. Furthermore, modeling the distribution of data points enables a cumulative distribution function to be developed for each data set. In addition to modeling the distributions of data in the data sets developed at 402 through Gaussian regression, a variety of other types of regression may be utilized by the process.

At 406, the process determines whether or not a trigger for a client-server communication parameter update has been detected. If no trigger is detected, the process returns to 402. However, if a trigger is detected, the process proceeds to 408.

In various implementations, triggers may be defined based on the statistics calculated at 404, based on historical network performance data, based on information pertaining to events that may impact network performance, based on a combination thereof, or based on additional criteria. For example, the statistical information calculated at 404 may be used to define triggers for updating client-server communication parameters. For example, if it is determined that some percentage of requests issued by a particular class of clients experience a latency that exceeds a predetermined threshold, a client-server communication parameter update may be triggered. For statistical triggers, thresholds may be determined according to current client-server communication parameters. For example, a socket timeout client-server communication parameter of ten seconds may correspond to an update trigger having a higher threshold connection failure time than a socket timeout client-server parameter of five seconds. Triggers may also vary based on the duration of the time window over which data points in a particular data set are accumulated. In some implementations, triggers may be defined based on statistical information for multiple data sets where different data sets are weighted differently. For example, the process may calculate a composite throttling score at 406 where the composite score is based on a sum of individual scores calculated for various individual data sets. Triggers may be defined by various composite throttling scores.

Other triggers for client-server parameter updates may correspond to events that are likely to impact the performance of a particular wireless network. For example, wireless carriers may reset a usage limit on a monthly basis at a predetermined time. A trigger for a client-server communication parameter update may be tied to the predetermined time at which the wireless carrier will reset the monthly usage limit. Thus, a client-server communication parameter update may be triggered by the time approaching that at which the wireless carrier will reset the usage limit. Other events that are not wireless network specific may impact the performance of multiple wireless networks and create triggers for client-server communication parameter updates. For example, a sporting event that attracts hundreds of thousands of people to a confined area with limited access to cellular towers or other wireless network resources may cause the performance of the wireless networks to suffer a considerable reduction within those geographic areas. Therefore, a client-server communication parameter update may be triggered for all clients within the confined geographic area at the time at which the event is set to take place. Similarly, a natural disaster impacting a particular geographic area may result in greater than average network traffic directed from clients within the geographic area to one or more particular servers, e.g. a weather server. Under such circumstances, the weather server could issue a client-server parameter update designed to account for the anticipated increase in network traffic.

Additional triggers for client-server parameter updates may not correspond to particular events but may instead be determined based upon periodic usage cycles. For example, a client-server communication parameter update may be triggered based on the transition from a first segment of a day to a second segment of a day and may be location specific. For example, decreased usage at particular times of day may correspond to one set of client-server parameters and the transition to a time of day characterized by greater usage may trigger an update in client-server parameters. Similarly, monthly and annual cycles may be defined and transitions from time periods characterized by higher usage to time periods characterized by lower usage—or vice versa—may trigger an update of the client-server communication parameters.

At 408, the server aggregates additional contextual and historical client-server communication data. The additional contextual and historical client-server data accumulated at 408 corresponds to the particular trigger that was detected at 406. For example, if the trigger that was detected at 406 was an event based trigger that prescribes a client-server communication parameter update as a result of the time approaching a time at which an event is scheduled to start, the process may query an external database, such as the database 104, in order to acquire additional information pertaining to the event. For example, if the trigger is the detection of a natural disaster that is likely to impact a particular geographic area, the server may query additional information pertaining to the natural disaster, e.g. the severity of the disaster and the geographic areas it is likely to impact. Furthermore, the server may request historical data pertaining to circumstances similar to those that gave rise to the trigger at 406. For example, if the trigger is the upcoming release of new media content on a media content server, historical data pertaining to downloads of similar media content in the past may be queried. Similarly, contextual information specific to the particular item that is to be released may be downloaded. For example, if the content is a wildly successful movie that may attract significant numbers of downloads, the magnitude of the impact of the release-triggered downloading may be indicated by the box-office success of the movie and the impact of the release of other movies that had similar box-office performances.

At 410, the process calculates updated, class-specific client-server communication parameters. In various implementations, various different client-server communication parameters may be specified by the process. Such client-server communication parameters may include but are not limited to socket timeout, i.e. the time limit after which a request that does not receive a response is re-tried, and a total number of allowed request retries before a request is deemed to be failed. In some implementations, the process may define particular baseline values for the client-server communication parameters based upon a set of baseline conditions. For example, a combination of time of day, time of month, and time of year may be used to define a set of baseline client-server communication parameters. Time of day, month, and year combinations that have historically corresponded to periods of relatively low wireless network latency and backend latency may correspond to client-server parameters of relatively low timeout thresholds and relatively high retry limits. By contrast, time of day, month, and year combinations that have historically corresponded to periods of relatively high wireless network latency and backend latency may correspond to relatively high timeout thresholds and relatively low retry limits. In this manner, the process may set threshold client-server communication parameters that are designed to limit the number of requests issued by clients during periods of time when carrier network traffic is likely to be high an to allow clients to issue larger number of requests and issue those requests more frequently when network traffic is likely to be low.

Furthermore, triggers detected at 406 and the statistics calculated at 404 may be utilized by the process to calculate a unique set of client-server parameters tailored to each class of clients and to the specific situation faced by each class. Specifically, the statistics calculated at 404 and the specific triggers detected at 406 may determine the values of the client-server communication parameters calculated at 410. In some implementations, particular client-server communication parameters may be mapped to particular triggers. For example, the client-server communication parameters calculated at 410 may be determined exclusively by the trigger that was detected at 406. In other implementations, the processing routines utilized to calculate the client-server communication parameters may take into account specific statistical information calculated at 404. In such implementations, the processing routines utilized to calculate the client-server communication parameters at 410 use various quantitative statistical inputs that correspond to the statistics calculated at 404. For example, the client-server communication parameters may be determined based on the mean or median user-facing latency and the standard deviation or variance of the user-facing latency. In calculating the client-server communication parameters, the processing routines may also use statistical values of distributions related to the backend latency associated with the processing of a client request, the on-the-wire latency associated with a client request, and other types of data.

The contextual data and historical client-server communication data acquired by the server at 408 may also be utilized in determining the updated client-server communication parameters at 410. For example, in the event that a trigger is tied to a time at which a wireless carrier or server will reset a limit on the amount of data that an individual client or local network can transmit and receive over a period of time prior, historical data aggregated by the server at 408 may be utilized in calculating the updated parameters. For example, the server 103 may analyze data pertaining to client-server requests from various client classifications immediately after such a data limit reset occurred and calculate the updated client-server communication parameters based on such historical data. The process may also take into account the number of members of each class that have reached the data limit in determining the updated client server communication parameters. For example, the server may calculate client-server communication parameters that are designed to limit network traffic more aggressively in the event that a particularly large percentage of the client class has met the data limit. By contrast, the process may calculate client-server communication parameters that are designed to limit network traffic less aggressively in the event that a smaller percent of the members of the client class has met the data limit.

In some implementations, the statistics calculated at 404 and the triggers detected at 406 may be utilized in conjunction with the contextual and historical information aggregated at 408 in order to calculate the updated class-specific client-server communication parameters at 410. The processing routines may consider a variety of information pertaining to each class of clients when determining the class-specific client-server communication parameters and may utilize different information for different classes. In some implementations, the processing routines utilized to calculate the updated client server parameters at 410 will utilize a variety of inputs in calculating the updated client server parameters. The inputs may include but are not limited to characteristics of distributions of client request data points, historical client-server communication performance corresponding to contextual situations similar to the present contextual situation facing the server, historical client-server communication performance at the same time of day, month, or year, specific characteristics of each client device and user account associated with each client device, and a variety of additional information.

At 412, the updated client-server communication parameters are transmitted to the class of clients for which they were calculated. In various implementations, the updated parameters can be transmitted in various manners. In some implementations, the updated parameters are broadcast, or multicast, to the clients that make up the class for which the updated parameters were calculated. For example, the updated parameters may be transmitted to all clients that utilize a particular wireless carrier. Alternatively, the updated parameters may be broadcast within a particular geographic location and all clients within range of the broadcast will receive the updated parameters. In further implementations, the updated parameters may be affixed to responses to client requests. For example, the updated parameters may be included in a header of the response.

Figure 5:
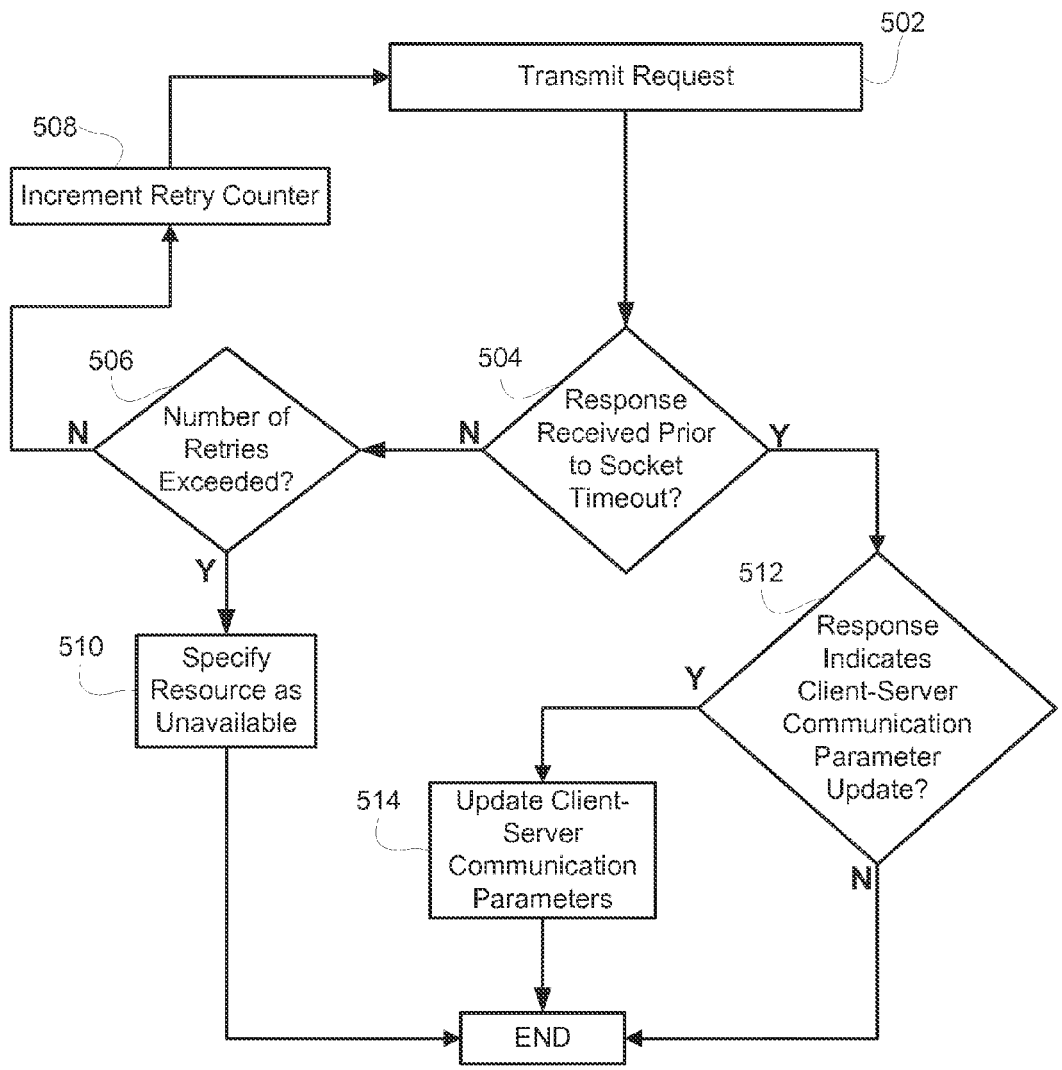
FIG. 5 is a flow diagram illustrating an example process for updating client-server communication parameters implemented at a client device in a system for server controlled throttling of client-server requests.

FIG. 5 is a flow diagram illustrating an example process for updating client-server communication parameters implemented at a client in a system for server controlled throttling of client-server requests. At 502, the client 101 transmits a request to the server 103. At 504, the client determines whether or not a request was received prior to the socket timeout client-server communication parameter has been reached. If a message is received before the socket timeout limit is reached, the process proceeds to 512. However, if no message is received before the socket timeout limit is reached, the process proceeds to 506.

At 506, the process determines whether or not the retry parameter limit has been reached. The retry parameter is a client server communication parameter that determines the number of times that a client will retry sending a request before determining that the server resource is unavailable. If the process determines at 506 that the number of retries has been exceeded, the process proceeds to 510 where the client identifies the resource as unavailable. Thereafter, the process ends. However, if the number of retries has not been exceeded, the process proceeds to 508, where a retry counter is incremented, and then returns to 502 where the request is transmitted again.

At 512, the client determines whether or not the response issued by the server is indicative of a client-server communication parameter update. If the process determines that the response does indicate a client-server communication parameter update, the process proceeds to 514 where the client updates its client-server communication parameters. Thereafter the process ends.

In various implementations, the server 103 may instruct the client to update the client-server communication parameters in a variety of manners. In the embodiment depicted by the flow chart in FIG. 5, the server 103 instructs the client to update the client-server communication parameters in a response to a request issued by the client. The instruction to update the parameters may be carried in a header of a packet that is responsive to the request issued by the client but may also be carried in the payload of the packet. In alternative implementations, the server 103 may instruct the client 101 to update the client-server communication parameters through packets that are pushed to the client 101 and not responsive to any request issued by the client. response indicate that the client-server communication parameters are to be updated in a variety of different manners. In some implementations, the It is contemplated that other implementations may differ in detail from the foregoing examples. As such, all references are intended to reference the particular implementation being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content from a content server. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
    generating, by a server, one or more data sets, wherein each data set from the one or more data sets includes a plurality of data points representing a characteristic of an instance of client-server communication between a respective client from a plurality of clients and the server, wherein each data point from the plurality of data points represents one or more of: a user-facing latency associated with a client-to-server request, a backend latency associated with processing of the client-to-server request, and an on-the-wire latency associated with the processing of the client-to-server request;
    determining, by the server and based at least in part on the one or more data sets, whether a condition for triggering a client-server communication parameter update has been met; and
    responsive to determining that the condition for triggering the client-server communication parameter update has been met:
        calculating, by the server, updated client-server communication parameters including at least an updated request retry limit identifying a maximum number of retries that the respective client from the plurality of clients are able to attempt prior to determining that a resource is unavailable; and
        transmitting, by the server and to one or more clients of the plurality of clients, the updated client-server communication parameters.

2. The method of claim 1, wherein the updated client-server communication parameters further include a socket timeout.

3. The method of claim 1, wherein each client from the plurality of clients is a member of a unique class of clients.

4. The method of claim 3, wherein the class of clients is defined by one or more of:
a network carrier, a geographic location, a characteristic of an affiliated user account, an IP address range, and a type of client device.

5. The method of claim 1, wherein determining whether a condition for triggering a client-server communication parameter update has been met comprises:
calculating, by the server, statistical characteristics of the one or more data sets; and
determining, by the server, whether the statistical characteristics of one of the one or more data sets exceeds a threshold.

6. The method of claim 5, further comprising:
determining, by the server and based on current values of the client-server communication parameters, the threshold.

7. The method of claim 1, wherein calculating updated client-server communication parameters is based at least in part on one or more of:
statistical characteristics of the one or more data sets, historical client-server communication performance, and occurrence of an event.

8. The method of claim 7, wherein the event comprises one or more of:
a server reset of a data transfer limit, a network carrier reset of a data transfer limit, and release of new content at the server.

9. The method of claim 1, wherein transmitting the updated client-server communication parameters to one or more clients comprises one of:
transmitting the updated client-server communication parameters in a header of a response to a client request,
transmitting the updated client-server communication parameters in a payload of a response to a client request, and
transmitting the updated client-server communication parameters via a push notification.

10. The method of claim 9, wherein transmitting the updated client-server communication parameters via the push notification comprises one of:
transmitting the updated client-server communication parameters via a broadcast, and
transmitting the updated client-server communication parameters via a multicast.

11. A device comprising:
a processor; and
a computer readable storage medium having stored thereon one or more modules executable by the processor to:
generate one or more data sets, wherein each data set from the one or more data sets includes a plurality of data points representing a characteristic of an instance of client-server communication between a respective client forma plurality of clients and the device, wherein each data point from the plurality of data points represents one or more of: a user-facing latency associated with a client-to-server request, a backend latency associated with processing of the client-to-server request, and an on-the-wire latency associated with the processing of the client-to-server request;
determine, based at least in part on the one or more data sets, whether a condition for triggering a client-server communication parameter update has been met; and
responsive to determining that the condition for triggering the client-server communication parameter update has been met:
calculate updated client-server communication parameters including at least an updated request retry limit identifying a maximum number of retries that the respective client from the plurality of clients are able to attempt prior to determining that a resource is unavailable; and
transmit, to one or more clients of the plurality of clients, the updated client-server communication parameters.

12. The server of claim 11, wherein the updated client-server communication parameters further include a socket timeout.

13. The server of claim 11, wherein each data point in each data set corresponds to an instance of client-server communication involving a client that is a member of a unique class of clients.

14. The server of claim 13, wherein the class of clients is defined by one or more of:
a network carrier, a geographic location, a characteristic of an affiliated user account, an IP address range, and a type of client device.

15. The server of claim 11, wherein the one or more modules are executable by the processor to determine whether the condition for triggering the client-server communication parameter update by at least being executable by the processor to:
calculate statistical characteristics of the one or more data sets; and
determine whether the statistical characteristics of one of the one or more data sets exceeds a threshold.

16. A non-transitory computer-readable storage medium encoded with instructions that, when executed, cause one or more processors of a computing device to:
generate one or more data sets, wherein each data set from the one or more data sets includes a plurality of data points representing a characteristic of an instance of client-server communication between a respective client from a plurality of clients and the device, wherein each data point from the plurality of data points represents one or more of: a user-facing latency associated with a client-to-server request, a backend latency associated with processing of the client-to-server request, and an on-the-wire latency associated with the processing of the client-to-server request;
determine, based at least in part on the one or more data sets, whether a condition for triggering a client-server communication parameter update has been met; and
responsive to determining that the condition for triggering the client-server communication parameter update has been met:
calculate updated client-server communication parameters including at least an updated request retry limit identifying a maximum number of retries that the respective client from the plurality of clients are able to attempt prior to determining that a resource is unavailable; and
transmit, to one or more clients of the plurality of clients, the updated client-server communication parameters.

17. The non-transitory computer-readable storage medium of claim 16, wherein each data point in each data set corresponds to an instance of client-server communication involving a client that is a member of a unique class of clients, and wherein the class of clients is defined by one or more of a network carrier, a geographic location, a characteristic of an affiliated user account, an IP address range, or a type of client device.

18. The non-transitory computer-readable storage medium of claim 16, wherein the instructions further cause the one or more processors to:
   calculate statistical characteristics of the one or more data sets; and
   determine whether the statistical characteristics of one of the one or more data sets exceeds a threshold.

19. The non-transitory computer-readable storage medium of claim 16, wherein the updated client-server communication parameters are calculated based at least in part on one or more of: statistical characteristics of the one or more data sets, historical client-server communication performance, and occurrence of an event.

20. The device of claim 11, wherein the updated client-server communication parameters are calculated based at least in part on one or more of: statistical characteristics of the one or more data sets, historical client-server communication performance, and occurrence of an event.

* * * * *